UNITED STATES PATENT OFFICE.

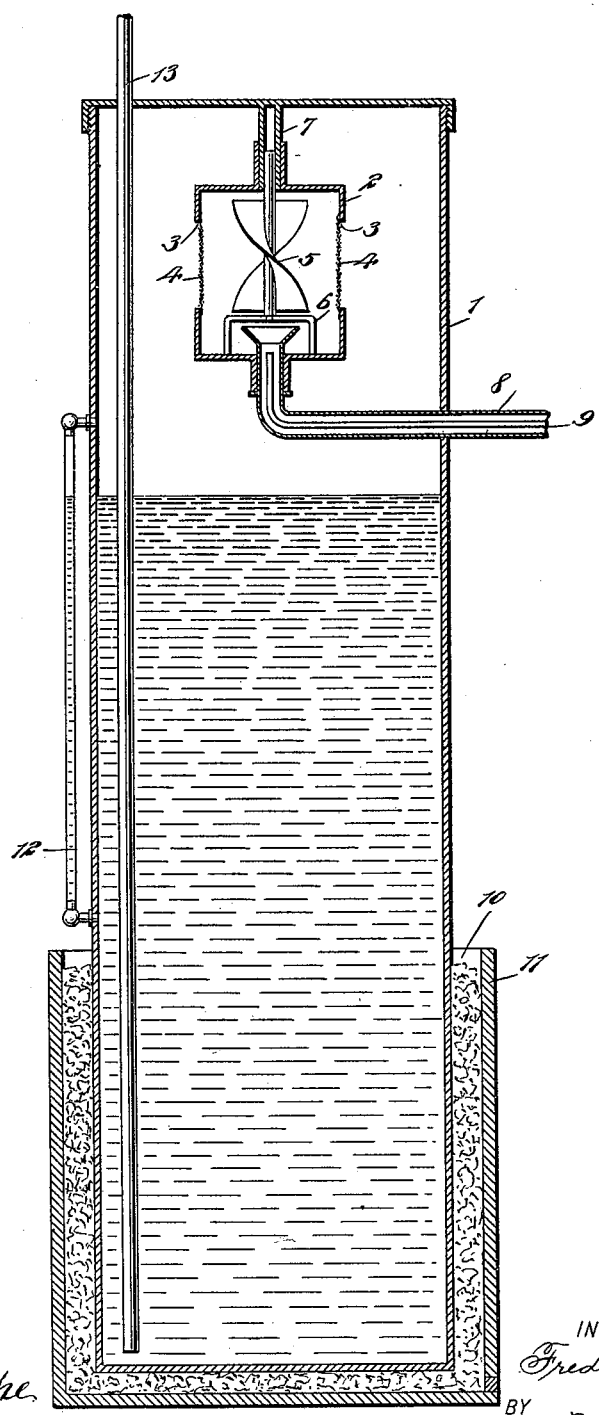

FREDERICK W. ZINGSEM, OF NEW YORK, N. Y., ASSIGNOR OF ONE-HALF TO WILLIAM F. LEWIS, OF SAME PLACE.

CARBONATING-MACHINE.

SPECIFICATION forming part of Letters Patent No. 626,126, dated May 30, 1899.

Application filed December 30, 1898. Serial No. 700,734. (No model.)

*To all whom it may concern:*

Be it known that I, FREDERICK W. ZINGSEM, of the city of New York, borough of Brooklyn, in the county of Kings and State of New York, have invented a new and Improved Carbonating-Machine, of which the following is a full, clear, and exact description.

This invention relates to improvements in machines for carbonating liquids, such as water; and the object is to provide a simple and comparatively inexpensive device for this purpose by means of which the gas and liquid will be thoroughly mixed in a very short time.

I will describe a carbonating-machine embodying my invention, and then point out the novel features in the appended claim.

Reference is to be had to the accompanying drawing, forming a part of this specification, in which the figure is a vertical section of a carbonating-machine embodying my invention.

The carbonating-machine comprises a cylinder 1, arranged in the upper portion of which is a casing 2, which forms a mixing-chamber for the gas and liquid. At two opposite sides this casing has openings 3, and in each opening a screen 4, of comparatively fine mesh, is arranged. The casing 2 is closed on its other two sides and at its top and bottom. It is shown as suspended from the upper wall of the cylinder 1.

Mounted to rotate on a vertical axis in the casing 2 is a beater in the form of a screw or propeller 5. The lower end of the shaft of this beater has a step bearing in a yoke 6, secured to the bottom wall of the casing, and the upper portion of said shaft has a bearing in a tube 7, extended from the top wall of the cylinder to which the casing is attached.

Leading from a suitable water-supply is a pipe 8, which extends through the wall of the cylinder and also through the bottom of the casing 2, and within the casing it is provided with a flaring mouth which is in line with the beater 5, and arranged within the pipe 8 is a gas-supply tube 9, the inner end of which terminates a short distance below the outlet of the water-pipe 8.

In operation the liquid under pressure will run through the pipe 8, and at the same time the gas will flow through the pipe 9 and discharge in the form of a small jet into the water as said water discharges from its pipe. The discharged water and gas will strike against the propeller-like beater 5 and cause it to rapidly rotate. This rotating motion of the beater will cause a mixing of the gas and water within the casing and throw it forcibly outward against the screens 4, and in passing through these screens the globules will be finely broken up, so that the gas and water will be still more thoroughly mixed.

It is found that more gas will be absorbed by the water when the water is kept at a low temperature. Therefore to aid in the carbonating of the water I employ a freezing mixture 10, which surrounds the lower portion of the cylinder 1. This freezing mixture is here shown as placed in a tank 11, which is about one-third the height of the cylinder 1. A water-gage 12 is placed on the cylinder, and a discharge-pipe 13 leads from near the bottom of the cylinder through its top.

Having thus described my invention, I claim as new and desire to secure by Letters Patent—

A carbonating-machine, comprising a cylinder, a casing suspended in the cylinder, the said casing being closed at opposite sides and having openings in its two other opposite sides, screens of fine mesh in said openings, a propeller-like beater in the casing and mounted to rotate on a vertical axis, a water-supply pipe extended through the bottom of the casing and adapted to discharge water against the lower end of the beater to rotate the same, a gas-supply tube having its discharge end a short distance below the outlet of the water-pipe, within which the tube is arranged, and a tank, for cooling material in which the cylinder is placed, substantially as specified.

FREDERICK W. ZINGSEM.

Witnesses:
JNO. M. RITTER,
C. R. FERGUSON.